No. 767,368. PATENTED AUG. 9, 1904.
E. J. WHITTLESEY.
TOASTER.
APPLICATION FILED OCT. 26, 1903.
NO MODEL.
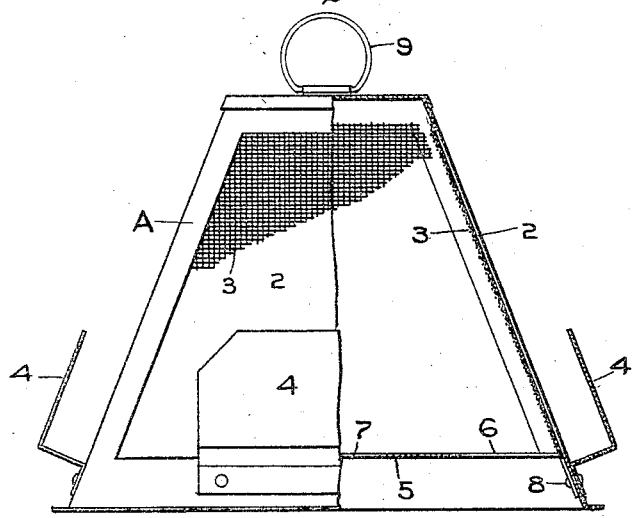
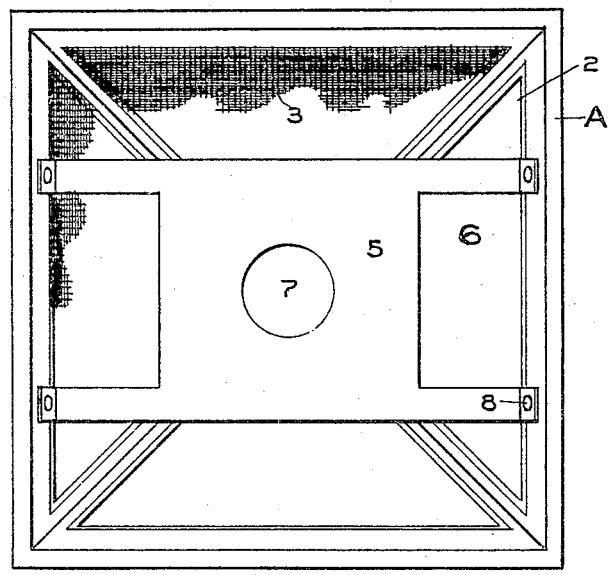
Witnesses,
W. H. Palmer
Emily F. Otis
Inventor,
Elisha J. Whittlesey
by Lothrop & Johnson
his Attorneys.

No. 767,368. Patented August 9, 1904.

UNITED STATES PATENT OFFICE.

ELISHA J. WHITTLESEY, OF ST. PAUL, MINNESOTA, ASSIGNOR TO H. S. JOHNSON, OF ST. PAUL, MINNESOTA, ROWLAND C. SMITH AND WALTER N. CARROLL, OF MINNEAPOLIS, MINNESOTA, AND EDITH O. WHITTLESEY, OF ST. PAUL, MINNESOTA.

TOASTER.

SPECIFICATION forming part of Letters Patent No. 767,368, dated August 9, 1904.

Application filed October 26, 1903. Serial No. 178,456. (No model.)

*To all whom it may concern:*

Be it known that I, ELISHA J. WHITTLESEY, a citizen of the United States, residing at St. Paul, in the county of Ramsey and State of Minnesota, have invented certain new and useful Improvements in Toasters, of which the following is a specification.

My invention relates to improvements in bread-toasters, its object being to provide a toaster designed particularly for use in connection with gas, gasolene, or oil stoves and by means of which the heat will pass directly to the bread in such a way as to evenly and quickly toast the same.

To this end my invention consists in the features of construction and combination hereinafter particularly described and claimed.

In the accompanying drawings, forming part of this specification, Figure 1 is a side elevation of my improved toaster, partly broken away; and Fig. 2 is a bottom view of the same.

In the drawings, A represents the outer shell of the toaster, preferably in the shape of the frustum of a pyramid. The four sides of the toaster are formed with openings 2, covered by screening 3, said screening being of fine enough mesh to stop the passage of the flame therethrough, while at the same time allowing circulation of air. Secured to the sides of the toaster below the screening are bread-holders 4 of suitable construction.

Secured in the open bottom of the toaster is a strip or plate 5, suitably secured, as by means of rivets 8, to the opposite side walls of the toaster. In order to allow the heat to pass directly to the screening, the strip 5 is interspaced at its sides from the adjacent side walls of the toaster and has in its ends openings 6 and is also provided with a central opening 7.

A suitable handle or ring 9 is secured at the top of the toaster.

In use the toaster will be positioned centrally over the burner of the stove. The flames and heat from the burner will pass through the spaces at the ends and sides of the spreader 5 directly to the screening 3, against the outer sides of which the slices of bread will be held by the holders 4. The flame and heat will also pass through the central opening 7, assisting in distributing and equalizing the heat above the spreader. The plate 5 acts as a spreader guiding the heat directly and evenly to the screening 3 to quickly and evenly toast the slices of bread.

While I have shown the toaster provided with four sides, I do not limit myself to that particular shape, but may vary the number of sides and make other minor changes, as in the shape of the spreader or bread-holders, without departing from the principles of my invention.

Having now described my invention, what I claim as new, and desire to secure by Letters Patent, is—

1. A toaster, comprising a shell of pyramidal shape, having its sides perforated, a plate centrally spanning the bottom of said shell and interspaced from the side walls thereof.

2. A toaster, consisting of an open-bottom shell of pyramidal shape, the side walls of said shell being perforate, bread-supports secured upon the sides of said shell, and a plane-surfaced spreader secured across the bottom of said shell, said spreader being provided with a central opening and being interspaced from the sides of said shell.

3. A toaster, consisting of an open-bottom shell, the side walls of said shell being formed with openings covered by wire-screening, bread-supports secured upon the sides of said shell below said screening, and a spreader secured across the bottom of said shell and interspaced from the side walls of said shell.

4. A toaster, consisting of an open-bottom shell, the side walls of said shell being provided with openings covered by screening, bread-supports secured upon the sides of said shell below said screening, and a spreader secured across the bottom of said shell in such manner as to direct heat from below directly to said screening.

In testimony whereof I affix my signature in presence of two witnesses.

ELISHA J. WHITTLESEY.

Witnesses:
H. S. JOHNSON,
EMILY F. OTIS.